United States Patent
Seetala et al.

(10) Patent No.: US 11,556,361 B2
(45) Date of Patent: Jan. 17, 2023

(54) MONITORING AND MANAGING OF COMPLEX MULTI-ROLE APPLICATIONS

(71) Applicant: Robin Systems, Inc., San Jose, CA (US)

(72) Inventors: Partha Sarathi Seetala, San Jose, CA (US); Raghavendra Pandimakki Ganesha, San Jose, CA (US); Lakshay Badlani, Hayward, CA (US); Manjunath Mageswaran, San Jose, CA (US)

(73) Assignee: Robin Systems, Inc., San Jose, CA (US)

( * ) Notice: Subject to any disclaimer, the term of this patent is extended or adjusted under 35 U.S.C. 154(b) by 89 days.

(21) Appl. No.: 17/116,197

(22) Filed: Dec. 9, 2020

(65) Prior Publication Data

US 2022/0179671 A1    Jun. 9, 2022

(51) Int. Cl.
| | |
|---|---|
| *G06F 15/16* | (2006.01) |
| *G06F 9/455* | (2018.01) |
| *H04L 43/08* | (2022.01) |
| *H04L 67/10* | (2022.01) |

(52) U.S. Cl.
CPC ............ *G06F 9/455* (2013.01); *H04L 43/08* (2013.01); *H04L 67/10* (2013.01)

(58) Field of Classification Search
CPC .............................. H04L 43/08; H04L 67/10
See application file for complete search history.

(56) References Cited

U.S. PATENT DOCUMENTS

| | | |
|---|---|---|
| 3,715,573 A | 2/1973 | Vogelsberg |
| 4,310,883 A | 1/1982 | Clifton |
| 5,602,993 A | 2/1997 | Stromberg |
| 5,680,513 A | 10/1997 | Hyland |
| 5,796,290 A | 8/1998 | Takahashi |
| 6,014,669 A | 1/2000 | Slaughter |
| 6,052,797 A | 4/2000 | Ofek |
| 6,119,214 A | 9/2000 | Dirks |
| 6,157,963 A | 12/2000 | Courtright, II |
| 6,161,191 A | 12/2000 | Slaughter |
| 6,298,478 B1 | 10/2001 | Nally |
| 6,301,707 B1 | 10/2001 | Carroll |
| 6,311,193 B1 | 10/2001 | Sekido |
| 6,851,034 B2 | 2/2005 | Challenger |

(Continued)

FOREIGN PATENT DOCUMENTS

WO    WO2017008675    1/2017

OTHER PUBLICATIONS

Segment map, GOOGLE, Feb. 4, 2019.

(Continued)

*Primary Examiner* — Padma Mundur
(74) *Attorney, Agent, or Firm* — David R. Stevens; Stevens Law Group

(57) ABSTRACT

A bundled application includes a plurality of entities such as logical storage volumes, application instances, pods, clusters, and computing nodes that are dependent on one another. Dependencies of the bundled application on individual entities is determined and quantified. Impact of failure of an entity may be determined using the dependencies. Dependency may be determined with reference to redundancy among entities. Usage of an entity by other entities and potential redistribution may be determined.

16 Claims, 7 Drawing Sheets

(56) References Cited

U.S. PATENT DOCUMENTS

| | | |
|---|---|---|
| 6,886,160 B1 | 4/2005 | Lee |
| 6,895,485 B1 | 5/2005 | Dekoning |
| 6,957,221 B1 | 10/2005 | Hart |
| 7,096,465 B1 | 8/2006 | Dardinski |
| 7,111,055 B2 | 9/2006 | Falkner |
| 7,171,659 B2 | 1/2007 | Becker |
| 7,246,351 B2 | 7/2007 | Bloch |
| 7,305,671 B2 | 12/2007 | Davidov |
| 7,386,752 B1 * | 6/2008 | Rakic .................. G06F 11/1469 714/2 |
| 7,461,374 B1 | 12/2008 | Balint |
| 7,467,268 B2 | 12/2008 | Lindemann |
| 7,535,854 B2 | 5/2009 | Luo |
| 7,590,620 B1 | 9/2009 | Pike |
| 7,698,698 B2 | 4/2010 | Skan |
| 7,721,283 B2 | 5/2010 | Kovachka |
| 7,734,859 B2 | 6/2010 | Daniel |
| 7,738,457 B2 | 6/2010 | Nordmark |
| 7,779,091 B2 | 8/2010 | Wilkinson |
| 7,797,693 B1 | 9/2010 | Gustafson |
| 7,984,485 B1 | 7/2011 | Rao |
| 8,037,471 B2 | 10/2011 | Keller |
| 8,046,450 B1 | 10/2011 | Schloss |
| 8,060,522 B2 | 11/2011 | Birdwell |
| 8,121,874 B1 | 2/2012 | Guheen |
| 8,171,141 B1 | 5/2012 | Offer |
| 8,219,821 B2 | 7/2012 | Zimmels |
| 8,250,033 B1 | 8/2012 | De Souter |
| 8,261,295 B1 | 9/2012 | Risbood |
| 8,326,883 B2 | 12/2012 | Pizzorni |
| 8,392,498 B2 | 3/2013 | Berg |
| 8,429,346 B1 | 4/2013 | Chen |
| 8,464,241 B2 | 6/2013 | Hayton |
| 8,505,003 B2 | 8/2013 | Bowen |
| 8,527,544 B1 | 9/2013 | Colgrove |
| 8,589,447 B1 | 11/2013 | Grunwald et al. |
| 8,601,467 B2 | 12/2013 | Hofhansl |
| 8,620,973 B1 | 12/2013 | Veeraswamy |
| 8,666,933 B2 | 3/2014 | Pizzorni |
| 8,745,003 B1 | 6/2014 | Patterson |
| 8,775,751 B1 | 7/2014 | Pendharkar |
| 8,782,632 B1 | 7/2014 | Chigurapati |
| 8,788,634 B2 | 7/2014 | Krig |
| 8,832,324 B1 | 9/2014 | Hodges |
| 8,886,806 B2 | 11/2014 | Tung |
| 8,909,885 B2 | 12/2014 | Corbett |
| 8,954,383 B1 | 2/2015 | Vempati |
| 8,954,568 B2 | 2/2015 | Krishnan |
| 8,966,198 B1 | 2/2015 | Harris |
| 9,009,542 B1 | 4/2015 | Marr |
| 9,134,992 B2 | 9/2015 | Wong |
| 9,146,769 B1 | 9/2015 | Shankar |
| 9,148,465 B2 | 9/2015 | Gambardella |
| 9,152,337 B2 | 10/2015 | Kono |
| 9,167,028 B2 | 10/2015 | Bansal |
| 9,280,591 B1 | 3/2016 | Kharatishvili |
| 9,330,155 B1 | 5/2016 | Bono |
| 9,336,060 B2 | 5/2016 | Nori |
| 9,342,444 B2 | 5/2016 | Minckler |
| 9,367,301 B1 | 6/2016 | Serrano |
| 9,390,128 B1 | 7/2016 | Seetala |
| 9,436,693 B1 | 9/2016 | Lockhart |
| 9,514,160 B2 | 12/2016 | Song |
| 9,521,198 B1 | 12/2016 | Agarwala |
| 9,569,274 B2 | 2/2017 | Tarta |
| 9,569,480 B2 | 2/2017 | Provencher |
| 9,590,872 B1 | 3/2017 | Jagtap |
| 9,600,193 B2 | 3/2017 | Ahrens |
| 9,613,119 B1 | 4/2017 | Aron |
| 9,619,389 B1 | 4/2017 | Roug |
| 9,635,132 B1 | 4/2017 | Lin |
| 9,667,470 B2 | 5/2017 | Prathipati |
| 9,733,992 B1 | 8/2017 | Poeluev |
| 9,747,096 B2 | 8/2017 | Searle |
| 9,870,366 B1 | 1/2018 | Duan |
| 9,880,933 B1 | 1/2018 | Gupta |
| 9,892,265 B1 | 2/2018 | Tripathy |
| 9,898,471 B1 | 2/2018 | Liu |
| 9,929,916 B1 | 3/2018 | Subramanian |
| 9,998,955 B1 | 6/2018 | MacCarthaigh |
| 10,019,459 B1 | 7/2018 | Agarwala |
| 10,042,628 B2 | 8/2018 | Thompson |
| 10,061,520 B1 | 8/2018 | Zhao |
| 10,133,619 B1 | 11/2018 | Nagpal |
| 10,169,169 B1 | 1/2019 | Shaikh |
| 10,191,778 B1 | 1/2019 | Yang |
| 10,241,774 B2 | 3/2019 | Spivak |
| 10,282,229 B2 | 5/2019 | Wagner |
| 10,339,112 B1 | 7/2019 | Ranade |
| 10,346,001 B2 | 7/2019 | Greenberg |
| 10,353,634 B1 | 7/2019 | Greenwood |
| 10,430,434 B2 | 10/2019 | Sun |
| 10,496,653 B1 | 12/2019 | Epshteyn |
| 10,564,850 B1 | 2/2020 | Gud |
| 10,657,119 B1 | 5/2020 | Acheson |
| 10,705,878 B2 | 7/2020 | Liu |
| 10,922,303 B1 | 2/2021 | Bruck |
| 10,956,246 B1 | 3/2021 | Bagde |
| 11,082,333 B1 | 8/2021 | Lam |
| 11,093,387 B1 | 8/2021 | Chinthekindi |
| 2002/0141390 A1 | 10/2002 | Fangman |
| 2003/0126426 A1 | 7/2003 | Frye |
| 2004/0010716 A1 | 1/2004 | Childress |
| 2004/0153703 A1 | 8/2004 | Vigue |
| 2004/0221125 A1 | 11/2004 | Ananthanarayanan |
| 2005/0065986 A1 | 3/2005 | Bixby |
| 2005/0216895 A1 | 9/2005 | Tran |
| 2005/0256948 A1 | 11/2005 | Hu |
| 2006/0025908 A1 | 2/2006 | Rachlin |
| 2006/0053357 A1 | 3/2006 | Rajski |
| 2006/0085674 A1 | 4/2006 | Ananthamurthy |
| 2006/0259686 A1 | 11/2006 | Sonobe |
| 2007/0006015 A1 | 1/2007 | Rao |
| 2007/0016786 A1 | 1/2007 | Waltermann |
| 2007/0033356 A1 | 2/2007 | Erlikhman |
| 2007/0067583 A1 | 3/2007 | Zohar |
| 2007/0165625 A1 | 7/2007 | Eisner |
| 2007/0169113 A1 * | 7/2007 | Moore ...................... G06F 8/61 717/174 |
| 2007/0260842 A1 | 11/2007 | Faibish |
| 2007/0277056 A1 | 11/2007 | Varadarajan |
| 2007/0288791 A1 | 12/2007 | Allen |
| 2008/0010421 A1 | 1/2008 | Chen |
| 2008/0068899 A1 | 3/2008 | Ogihara |
| 2008/0083012 A1 | 4/2008 | Yu |
| 2008/0189468 A1 | 8/2008 | Schmidt |
| 2008/0235544 A1 | 9/2008 | Lai |
| 2008/0256141 A1 | 10/2008 | Wayda |
| 2008/0256143 A1 | 10/2008 | Reddy |
| 2008/0256167 A1 | 10/2008 | Branson |
| 2008/0263400 A1 | 10/2008 | Waters |
| 2008/0270592 A1 | 10/2008 | Choudhary |
| 2009/0144497 A1 | 6/2009 | Withers |
| 2009/0172335 A1 | 7/2009 | Kulkarni |
| 2009/0240809 A1 | 9/2009 | La Frese |
| 2009/0254701 A1 | 10/2009 | Kurokawa |
| 2009/0307249 A1 | 12/2009 | Koifman |
| 2010/0100251 A1 | 4/2010 | Chao |
| 2010/0161941 A1 | 6/2010 | Vyshetsky |
| 2010/0162233 A1 | 6/2010 | Ku |
| 2010/0211815 A1 | 8/2010 | Mankovskii |
| 2010/0274984 A1 | 10/2010 | Inomata |
| 2010/0299309 A1 | 11/2010 | Maki |
| 2010/0306495 A1 | 12/2010 | Kumano |
| 2010/0332730 A1 | 12/2010 | Royer |
| 2011/0083126 A1 | 4/2011 | Bhakta |
| 2011/0119664 A1 | 5/2011 | Kimura |
| 2011/0161291 A1 | 6/2011 | Taleck |
| 2011/0188506 A1 | 8/2011 | Arribas |
| 2011/0208928 A1 | 8/2011 | Chandra |
| 2011/0239227 A1 | 9/2011 | Schaefer |
| 2011/0246420 A1 | 10/2011 | Wang |
| 2011/0276951 A1 | 11/2011 | Jain |
| 2012/0005557 A1 | 1/2012 | Mardiks |

(56) References Cited

U.S. PATENT DOCUMENTS

| | | |
|---|---|---|
| 2012/0016845 A1 | 1/2012 | Bates |
| 2012/0066449 A1 | 3/2012 | Colgrove |
| 2012/0102369 A1 | 4/2012 | Hiltunen |
| 2012/0137059 A1 | 5/2012 | Yang |
| 2012/0159519 A1 | 6/2012 | Matsuda |
| 2012/0216052 A1 | 8/2012 | Dunn |
| 2012/0226667 A1 | 9/2012 | Volvovski |
| 2012/0240012 A1 | 9/2012 | Weathers |
| 2012/0259819 A1 | 10/2012 | Patwardhan |
| 2012/0265976 A1 | 10/2012 | Spiers |
| 2012/0303348 A1 | 11/2012 | Lu |
| 2012/0311671 A1 | 12/2012 | Wood |
| 2012/0331113 A1 | 12/2012 | Jain |
| 2013/0054552 A1 | 2/2013 | Hawkins |
| 2013/0054932 A1 | 2/2013 | Acharya |
| 2013/0080723 A1 | 3/2013 | Sawa |
| 2013/0179208 A1 | 7/2013 | Chung |
| 2013/0254521 A1 | 9/2013 | Bealkowski |
| 2013/0282662 A1 | 10/2013 | Kumarasamy |
| 2013/0332688 A1 | 12/2013 | Corbett |
| 2013/0339659 A1 | 12/2013 | Bybell |
| 2013/0346618 A1 | 12/2013 | Holkkola |
| 2013/0346709 A1 | 12/2013 | Wang |
| 2014/0006465 A1 | 1/2014 | Davis |
| 2014/0047263 A1 | 2/2014 | Coatney |
| 2014/0047341 A1 | 2/2014 | Breternitz |
| 2014/0047342 A1 | 2/2014 | Breternitz |
| 2014/0058871 A1 | 2/2014 | Marr |
| 2014/0059527 A1 | 2/2014 | Gagliardi |
| 2014/0059528 A1 | 2/2014 | Gagliardi |
| 2014/0089265 A1 | 3/2014 | Talagala |
| 2014/0108483 A1 | 4/2014 | Tarta |
| 2014/0130040 A1 | 5/2014 | Lemanski |
| 2014/0149696 A1 | 5/2014 | Frenkel |
| 2014/0181676 A1 | 6/2014 | Samborskyy |
| 2014/0195847 A1 | 7/2014 | Webman |
| 2014/0245319 A1 | 8/2014 | Fellows |
| 2014/0281449 A1 | 9/2014 | Christopher |
| 2014/0282596 A1 | 9/2014 | Bourbonnais |
| 2015/0007171 A1 | 1/2015 | Blake |
| 2015/0019495 A1 | 1/2015 | Siden |
| 2015/0046644 A1 | 2/2015 | Karp |
| 2015/0067031 A1 | 3/2015 | Acharya |
| 2015/0074358 A1 | 3/2015 | Flinsbaugh |
| 2015/0106549 A1 | 4/2015 | Brown |
| 2015/0112951 A1 | 4/2015 | Narayanamurthy et al. |
| 2015/0134857 A1 | 5/2015 | Hahn |
| 2015/0149605 A1 | 5/2015 | De La Iglesia |
| 2015/0186217 A1 | 7/2015 | Eslami |
| 2015/0278333 A1 | 10/2015 | Hirose |
| 2015/0317169 A1 | 11/2015 | Sinha |
| 2015/0317212 A1 | 11/2015 | Lee |
| 2015/0319160 A1 | 11/2015 | Ferguson |
| 2015/0326481 A1 | 11/2015 | Rector |
| 2015/0379287 A1 | 12/2015 | Mathur |
| 2016/0011816 A1 | 1/2016 | Aizman |
| 2016/0026667 A1 | 1/2016 | Mukherjee |
| 2016/0042005 A1 | 2/2016 | Liu |
| 2016/0124775 A1 | 5/2016 | Ashtiani |
| 2016/0150047 A1 | 5/2016 | O'Hare |
| 2016/0191308 A1 | 6/2016 | Berry |
| 2016/0197995 A1 | 7/2016 | Lu |
| 2016/0239412 A1 | 8/2016 | Wada |
| 2016/0259597 A1 | 9/2016 | Worley |
| 2016/0283261 A1 | 9/2016 | Nakatsu |
| 2016/0357456 A1 | 12/2016 | Iwasaki |
| 2016/0357548 A1 | 12/2016 | Stanton |
| 2016/0373327 A1 | 12/2016 | Degioanni |
| 2017/0034023 A1 | 2/2017 | Nickolov |
| 2017/0060710 A1 | 3/2017 | Ramani |
| 2017/0060975 A1 | 3/2017 | Akyureklier |
| 2017/0075749 A1 | 3/2017 | Ambichl |
| 2017/0139645 A1 | 5/2017 | Byun |
| 2017/0149843 A1 | 5/2017 | Amulothu |
| 2017/0168903 A1 | 6/2017 | Dornemann |
| 2017/0192889 A1 | 7/2017 | Sato |
| 2017/0201419 A1 | 7/2017 | Garcia |
| 2017/0206017 A1 | 7/2017 | Sun |
| 2017/0214550 A1 | 7/2017 | Kumar |
| 2017/0235649 A1 | 8/2017 | Shah |
| 2017/0242617 A1 | 8/2017 | Walsh |
| 2017/0242719 A1 | 8/2017 | Tsirkin |
| 2017/0244557 A1 | 8/2017 | Riel |
| 2017/0244787 A1 | 8/2017 | Rangasamy |
| 2017/0293450 A1 | 10/2017 | Battaje |
| 2017/0322954 A1 | 11/2017 | Horowitz |
| 2017/0337492 A1 | 11/2017 | Chen |
| 2017/0344354 A1 | 11/2017 | Schiefelbein |
| 2017/0371551 A1 | 12/2017 | Sachdev |
| 2018/0006896 A1 | 1/2018 | MacNamara |
| 2018/0024889 A1 | 1/2018 | Verma |
| 2018/0046553 A1 | 2/2018 | Okamoto |
| 2018/0082053 A1 | 3/2018 | Brown |
| 2018/0107419 A1 | 4/2018 | Sachdev |
| 2018/0113625 A1 | 4/2018 | Sancheti |
| 2018/0113770 A1 | 4/2018 | Hasanov |
| 2018/0136931 A1 | 5/2018 | Hendrich |
| 2018/0137306 A1 | 5/2018 | Brady |
| 2018/0150306 A1 | 5/2018 | Govindaraju |
| 2018/0159745 A1 | 6/2018 | Byers |
| 2018/0165170 A1 | 6/2018 | Hegdal |
| 2018/0218000 A1 | 8/2018 | Setty |
| 2018/0225140 A1 | 8/2018 | Titus |
| 2018/0225216 A1 | 8/2018 | Filippo |
| 2018/0246670 A1 | 8/2018 | Baptist |
| 2018/0246745 A1 | 8/2018 | Aronovich |
| 2018/0247064 A1 | 8/2018 | Aronovich |
| 2018/0267820 A1 | 9/2018 | Jang |
| 2018/0276215 A1 | 9/2018 | Chiba |
| 2018/0285164 A1 | 10/2018 | Hu |
| 2018/0285223 A1 | 10/2018 | McBride |
| 2018/0285353 A1 | 10/2018 | Ramohalli |
| 2018/0287883 A1 | 10/2018 | Joshi |
| 2018/0288129 A1 | 10/2018 | Joshi |
| 2018/0300653 A1 | 10/2018 | Srinivasan |
| 2018/0302335 A1 | 10/2018 | Gao |
| 2018/0329981 A1 | 11/2018 | Gupte |
| 2018/0364917 A1 | 12/2018 | Ki |
| 2018/0365092 A1 | 12/2018 | Linetskiy |
| 2018/0375728 A1 | 12/2018 | Gangil |
| 2019/0004704 A1 | 1/2019 | Rathi |
| 2019/0065061 A1 | 2/2019 | Kim |
| 2019/0065323 A1 | 2/2019 | Dhamdhere |
| 2019/0073132 A1 | 3/2019 | Zhou |
| 2019/0073372 A1 | 3/2019 | Venkatesan |
| 2019/0079928 A1 | 3/2019 | Kumar |
| 2019/0089651 A1 | 3/2019 | Pignatari |
| 2019/0102226 A1 | 4/2019 | Caldato |
| 2019/0109756 A1 | 4/2019 | Abu Lebdeh |
| 2019/0116690 A1 | 4/2019 | Chen |
| 2019/0132203 A1 | 5/2019 | Wince |
| 2019/0148932 A1 | 5/2019 | Benesch |
| 2019/0156023 A1 | 5/2019 | Gerebe |
| 2019/0163460 A1 | 5/2019 | Kludy |
| 2019/0188094 A1 | 6/2019 | Ramamoorthi |
| 2019/0190803 A1 | 6/2019 | Joshi |
| 2019/0199601 A1 | 6/2019 | Lynar |
| 2019/0213080 A1 | 7/2019 | Alluboyina |
| 2019/0213085 A1 | 7/2019 | Alluboyina |
| 2019/0215313 A1 | 7/2019 | Doshi |
| 2019/0220266 A1 | 7/2019 | Doshi |
| 2019/0220315 A1 | 7/2019 | Vallala |
| 2019/0220527 A1 | 7/2019 | Sarda |
| 2019/0235895 A1 | 8/2019 | Ovesea |
| 2019/0250849 A1 | 8/2019 | Compton |
| 2019/0272205 A1 | 9/2019 | Jiang |
| 2019/0278624 A1 | 9/2019 | Bade |
| 2019/0324666 A1 | 10/2019 | Kusters |
| 2019/0334727 A1 | 10/2019 | Kaufman |
| 2019/0335551 A1 | 10/2019 | Williams |
| 2019/0361748 A1 | 11/2019 | Walters |
| 2019/0369273 A1 | 12/2019 | Liu |
| 2019/0370018 A1 | 12/2019 | Kirkpatrick |
| 2020/0019414 A1 | 1/2020 | Byard |

(56) References Cited

U.S. PATENT DOCUMENTS

| | | | |
|---|---|---|---|
| 2020/0026635 | A1 | 1/2020 | Gaber |
| 2020/0034193 | A1 | 1/2020 | Jayaram |
| 2020/0034254 | A1 | 1/2020 | Natanzon |
| 2020/0065406 | A1 | 2/2020 | Lppatapu |
| 2020/0073586 | A1 | 3/2020 | Kurata |
| 2020/0083909 | A1 | 3/2020 | Kusters |
| 2020/0150977 | A1 | 5/2020 | Wang |
| 2020/0162330 | A1 | 5/2020 | Vadapalli |
| 2020/0257519 | A1 | 8/2020 | Shen |
| 2020/0310774 | A1 | 10/2020 | Zhu |
| 2020/0310915 | A1 | 10/2020 | Alluboyina |
| 2020/0344326 | A1 | 10/2020 | Ghosh |
| 2020/0356537 | A1 | 11/2020 | Sun |
| 2020/0412625 | A1 | 12/2020 | Bagarolo |
| 2021/0011775 | A1 | 1/2021 | Baxter |
| 2021/0029000 | A1 | 1/2021 | Mordani |
| 2021/0042151 | A1 | 2/2021 | Muller |
| 2021/0064536 | A1 | 3/2021 | Palmer |
| 2021/0067607 | A1 | 3/2021 | Gardner |
| 2021/0126839 | A1 | 4/2021 | Rudrachar |
| 2021/0141655 | A1 | 5/2021 | Gamage |
| 2021/0157622 | A1 | 5/2021 | Ananthapur |
| 2021/0168034 | A1 | 6/2021 | Qian |
| 2021/0271506 | A1 | 9/2021 | Ganguly |
| 2021/0406079 | A1 | 12/2021 | Atur |
| 2022/0107842 | A1* | 4/2022 | Jiang .................. G06F 9/505 |

OTHER PUBLICATIONS

Fast and Secure Append-Only storage with Infinite Capacity, ZHENG, Aug. 27, 2003.

User Mode and Kernel Mode, MICROSOFT, Apr. 19, 2017.

Precise memory leak detection for java software using container profiling, XU, Jul. 2013.

Mogi et al., "Dynamic Parity Stripe Reorganizations for RAID5 Disk Arrays," 1994, IEEE, pp. 17-26.

Syed et al, "The Container Manager Pattern", ACM, pp. 1-9 (Year 2017).

Rehmann et al., "Performance of Containerized Database Management Systems", ACM, pp. 1-6 (Year 2018).

Awada et al, "Improving Resource Efficiency of Container-instance Clusters on Clouds", IEEE, pp. 929-934 (Year 2017).

Stankovski et al, "Implementing Time—Critical Functionalities with a Distributed Adaptive Container Architecture", ACM, pp. 1-5 (Year 2016).

Dhakate et al, "Distributed Cloud Monitoring Using Docker as Next Generation Container Virtualization Technology" IEEE, pp. 1-5 (Year 2015).

Crameri et al, "Staged Deployment in Mirage, an Integrated Software Upgrade Testing and Distribution System", ACM, pp. 221-236 (Year: 2007).

Cosmo et al, "Packages Upgrades in FOSS Distributions: Details and Challenges", ACM pp. 1-5 (Year: 2008).

Burg et al, "Atomic Upgrading of Distributed Systems", ACM, pp. 1-5 (Year: 2008).

Souer et al, "Component Based Architecture forWeb Content Management: Runtime Deployable Web Manager Component Bundles", IEEE, pp. 366-369 (Year: 2008).

Weingartner et al, "A distributed autonomic management framework for cloud computing orchestration." In 2016 IEEE World Congress on Services (Year: 2016).

* cited by examiner

MONITORING AND MANAGING OF COMPLEX MULTI-ROLE APPLICATIONS

BACKGROUND

Field of the Invention

This invention relates to orchestration of a multi-role application.

Background of the Invention

A multi-role application may include many objects providing different roles of the application. These objects may be application implementing services, storage volumes, databases, web servers, and the like. One environment that facilitates deployment of such applications is KUBERNETES, which was originally developed by GOOGLE.

It would be an advancement in the art to facilitate the deployment and management of multi-role applications, including those orchestrated using KUBERNETES.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
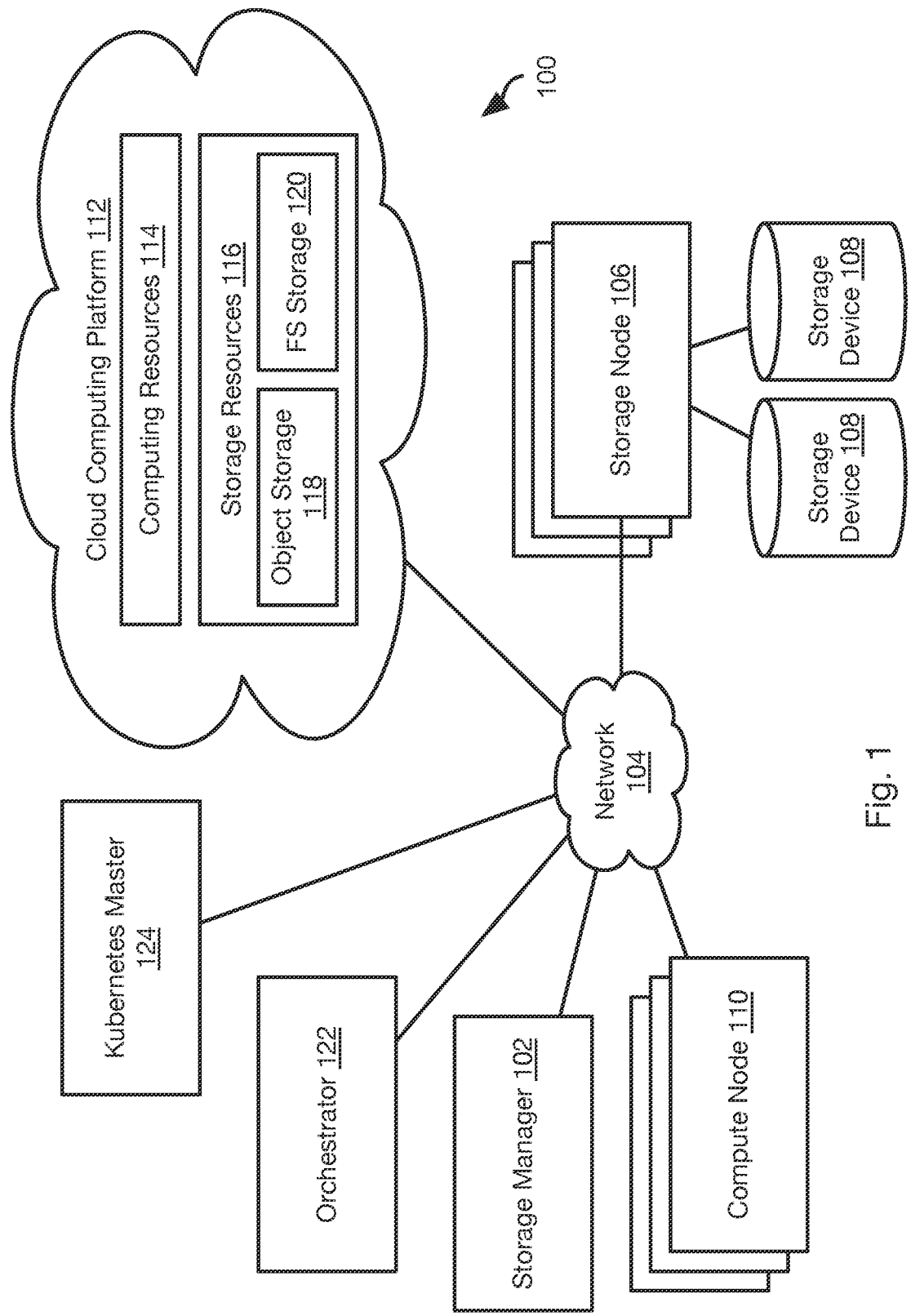
FIG. 1 is a schematic block diagram of a network environment for implementing methods in accordance with an embodiment of the present invention.

Referring to FIG. 1, the methods disclosed herein may be performed using the illustrated network environment 100. The network environment 100 includes a storage manager 102 that coordinates the creation of snapshots of storage volumes and maintains records of where snapshots are stored within the network environment 100. In particular, the storage manager 102 may be connected by way of a network 104 to one or more storage nodes 106, each storage node having one or more storage devices 108, e.g. hard disk drives, flash memory, or other persistent or transitory memory. The network 104 may be a local area network (LAN), wide area network (WAN), or any other type of network including wired, fireless, fiber optic, or any other type of network connections.

One or more compute nodes 110 are also coupled to the network 104 and host user applications that generate read and write requests with respect to storage volumes managed by the storage manager 102 and stored within the memory devices 108 of the storage nodes 106.

The methods disclosed herein ascribe certain functions to the storage manager 102, storage nodes 106, and compute node 110. The methods disclosed herein are particularly useful for large scale deployment including large amounts of data distributed over many storage nodes 106 and accessed by many compute nodes 110. However, the methods disclosed herein may also be implemented using a single computer implementing the functions ascribed herein to some or all of the storage manager 102, storage nodes 106, and compute node 110.

A cloud computing platform 112 may be coupled to the network 104 and include cloud computing resources 114 and storage resources 116. The storage resources 116 may include various types of storage including object storage 118 in which data is stored as unstructured data and which is generally less expensive and has higher latency. The storage resources may include file system storage 120 that is implemented as a virtual disk in which data is stored in a structured format, such as within a hierarchical file system or according to an append-only storage system.

The cloud computing platform 112 and corresponding resources 114, 116 may be implemented using any cloud computing platform known in the art such as AMAZON WEB SERVICES (AWS), MICROSOFT AZURE, GOOGLE CLOUD, or the like.

The methods disclosed herein may be of particular advantage when used in an environment with one or more orchestrators. For example, one orchestration layer may be an orchestrator 122 that instantiates a set of applications, such as an application bundle or pipeline of network services, according to a manifest, which may include instantiating various containers, role instances executing within containers. The orchestrator 122 may further request allocation of logical storage volumes by a storage manager 102 that implements storage volumes that are mounted to containers.

Another orchestrator may be a KUBERNETES (hereinafter "Kubernetes") installation. As known in the art, a Kubernetes installation may include a Kubernetes master 124 that receives instructions in the form of a helm chart, StatefulSet, or operators received from a user or script. The instructions may instruct the Kubernetes master 124 to allocate a Kubernetes node, which is a computer or virtual (e.g., cloud) computing resource that is allocated for providing a service. The Kubernetes master may invoke installation of a Kubelet on the node, which is an agent that implements instructions from the master 124 as well as reports the status of components executing on the node. A node may execute one or more pods, which is a group of one or more containers with shared resources, such as storage resources, network resources, or the like. The pod may further define a virtual machine in which all containers of the pod execute. The pod may define a common name space that is accessible by all of the containers of the pod. A pod may have storage resources associated therewith such as in the form of one or more PVCs (persistent volume claim) that associated with the pod.

The container may implement one or more services, such as a database (MONGO DB, SQL, POSTGRE SQL ORACLE, etc.), webserver, CASSANDRA server, HADOOP component, or any other service known in the art. The service may be configured to provide services to another service of the Kubernetes installation or role instances instantiated and managed by the orchestrator 122 or use another service of the Kubernetes installation or role instance orchestrator 122. The configuration of a service to use or provide a service may be in response to instructions from the Kubernetes master 124 interpreting instructions from the helm chart, StatefulSet, or user operators. The Kubernetes master 124 may instruct the Kubelet to implement these instructions to configure the services.

Figure 2:
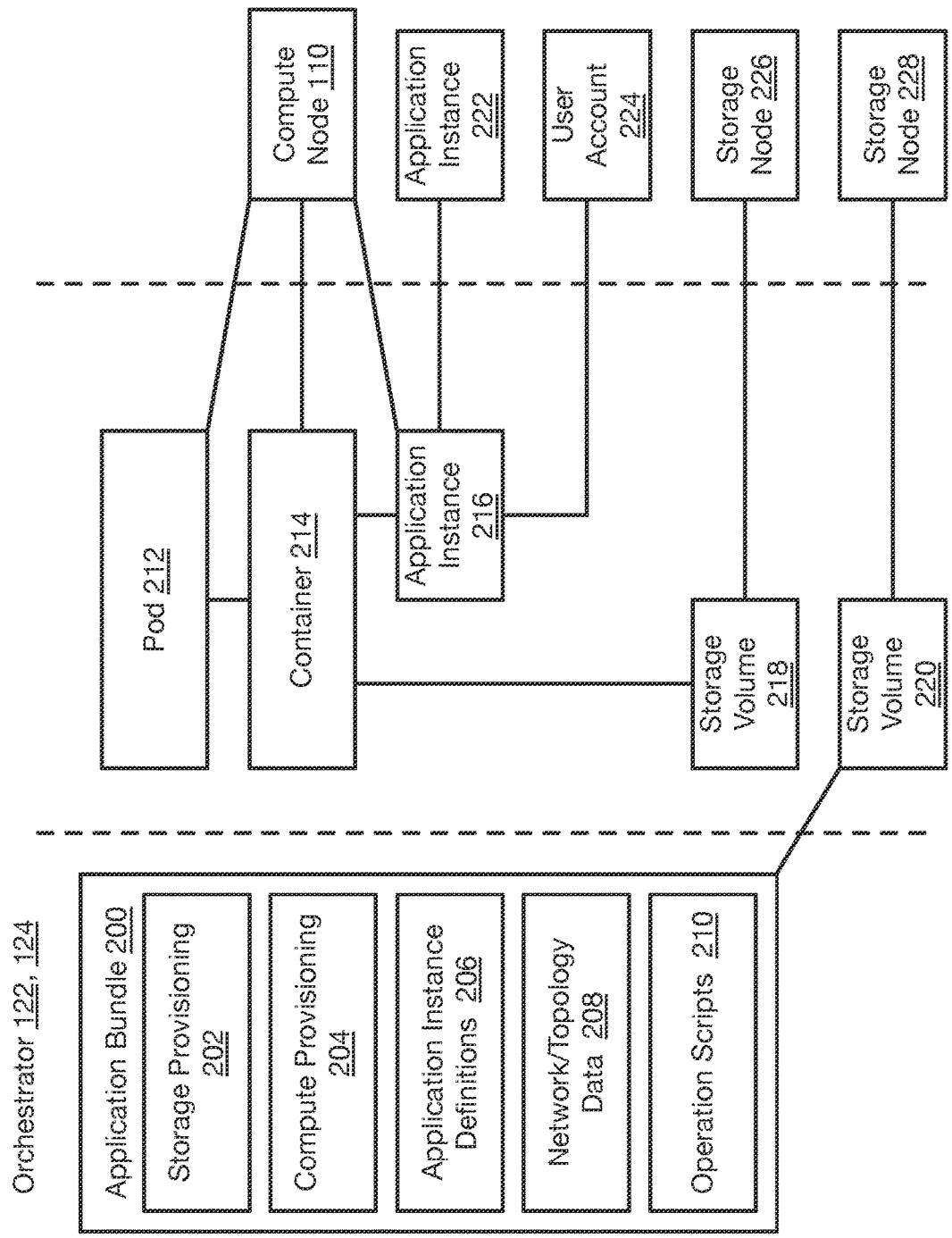
FIG. 2 is a schematic block diagram of components of a bundled application in accordance with an embodiment of the present invention.

Referring to FIG. 2, an orchestrator, e.g., one or both of the orchestrator 122 and the Kubernetes master 124, may take as input an application bundle 200. The application bundle 200 refers to scripts, individual instructions, and other programming input to the orchestrator to invoke the instantiation and configuration of application instances in a network environment 100 in order to implement a bundled application, network service pipeline, or other type of installation.

The application bundle 200 may include storage provisioning 202 defining an amount of storage resources to be allocated to a particular entity (container, pod, cluster, application instance, etc.). The storage provisioning 202 may define the creation of logical storage volumes that provide virtualization of storage residing on a storage node 108 or the cloud storage resources 116. Accordingly, storage provisioning 202 may be processed by the storage manager 102 to implement the logical storage volumes on a storage node 108 or in cloud storage resources 116.

The application bundle 200 may include compute provisioning 204 defining provisioning of computing resources such as processing cores on compute nodes 110 or cloud computing resources 114 (e.g., elastic compute cloud (EC2) on AWS). The provisioning 204 may define an amount of computing resources to allocate to a particular container or application instance.

One or both of the storage provisioning 202 and compute provisioning 204 may define provisioning constraints for an entity (logical storage volume or computing resource) with respect to another entity. This may include an affinity constraints (required degree of proximity (same node, same server rack, or same data center)) or anti-affinity constraints (a forbidden degree of proximity (different node, different server rack, or different data center)).

The application bundle 200 may include application instance definitions 206. The application instance definitions 206 may reference executables for clusters, pods, containers, applications, or other programs and define where the executables are to be instantiated (which compute node 110, in which container, which cloud computing resource 114). The definitions 206 may further include configuration information in the form of variables, configurations files, scripts, or the like.

The application bundle 200 may include network and/or topology data 208. The network/topology data 208 may include network addresses of entities instantiated according to the application instance definitions 206, network domains in which the entities are grouped, or other information. The network/topology data 208 may further define relationships between entities. Example relationships may include:

one entity using a service provided by another entity.
one entity executing on or within another entity (e.g., application instance in a container, entity executing on a node or cloud computing resource 114)
one entity being managed by another entity (e.g., container in a pod, pod in a cluster).

That the network/topology data 208 may be incorporated into the application instance definitions 206, i.e. the application instance definitions 206 may include configuration data that configures entities to use network addresses and have required relationships to one or more other entities.

The application bundle 200 may include operation scripts 210. Operation scripts 210 may include scripts that are executed for entities instantiated according to the application bundle or for an entire instance of a bundled application created according to the application bundle 200. The scripts 210 may be executed by the orchestrator 122, Kubernetes master 124, or other entity. Scripts 210 may be defined for performing before, during, or after, an operation with respect to an entity such as creating, backing up, restoring, moving, cloning, performing a health check, or other operations.

The application bundle 200 may be processed by one or both of the orchestrator 122 and Kubernetes master 124 to instantiate and configure various entities on one or more nodes 110. Entities may be instantiated and configured on a cloud computing resource 114 in a like manner.

In the illustrated example, a pod 212 may be instantiated on a node 110. One or more containers 214 may be instantiated on the node 110 and managed by the pod 212. Each container may host one or more application instances 216 and have one or more storage volumes 218 mounted thereto. One or more storage volumes 220 may store the application bundle 200 and may be required to be accessible in order for a bundled application to be created and managed. In particular, application instances 206 and operation scripts 210 may be used throughout a lifespan of a bundled application.

FIG. 2 illustrates elements of a topology that may be present in the bundled application created according to the application bundle 200. An application instance 206 is dependent on the container 214 executing it. A container 214 and its application instances 206 may be dependent on a pod 212 managing it. In addition, pods 212 may belong to a cluster defined according to the application bundle 200. Accordingly, pods 212 and possibly the compute nodes 110 executing them may be managed by a cluster instance.

The application instance 216 may have a dependency on another application instance 222 (use a service provide by it or provide a service to it). The application instance 216 may have one or more users accounts 224 of users that use that application instance. Storage volumes 218, 220 may be hosted by one or more storage nodes 226, 228 or on cloud storage resources 116. The components illustrated in FIG. 2 are exemplary only and a typical bundled application could include many hundreds of entities having any of the illustrated relationships.

Figure 3:
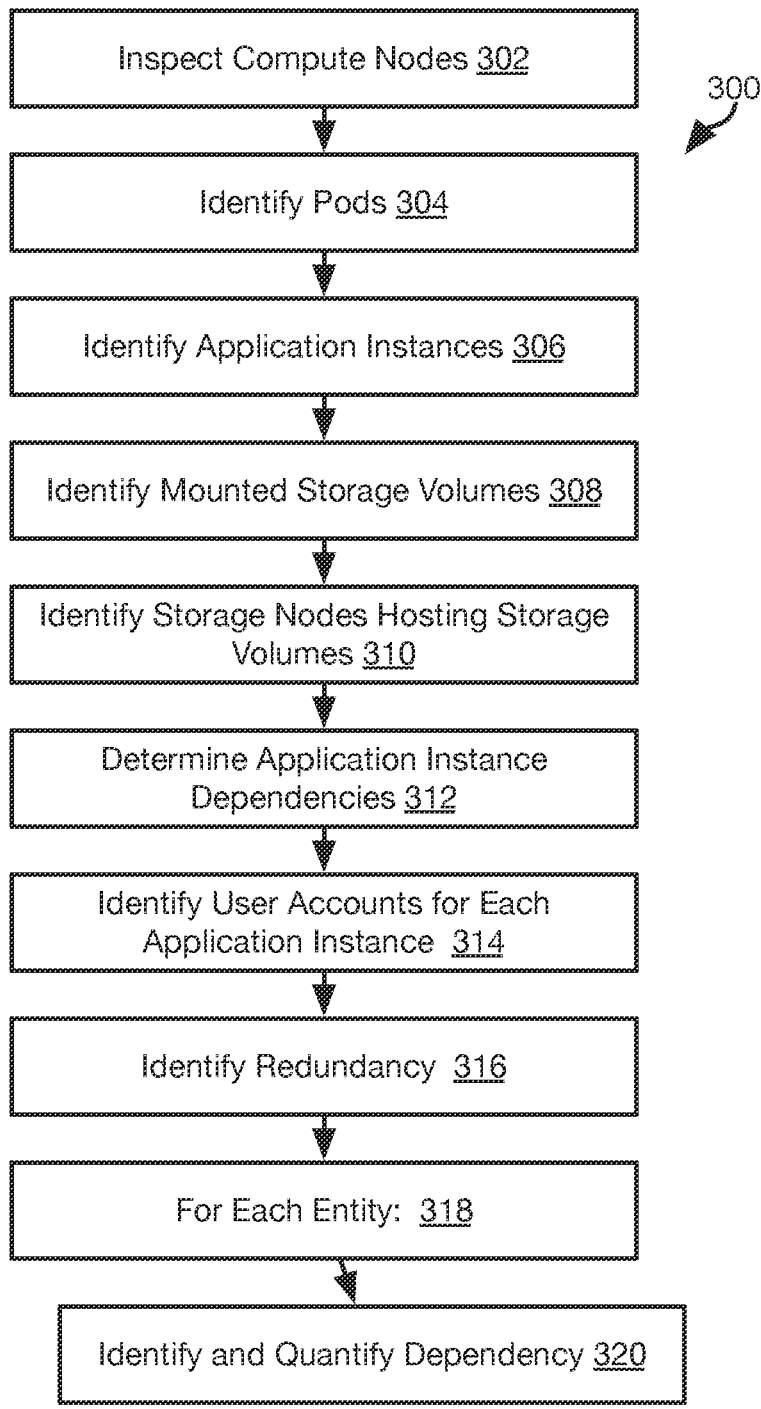
FIG. 3 is a process flow diagram of a method for determining and quantifying dependency of a bundled application on an entity in accordance with an embodiment of the present invention.

FIG. 3 illustrates a method 300 that may be executed with respect to a bundled application in order to characterize dependencies and therefore potential vulnerabilities, of a bundled application, such as one having entities with the relationships shown in FIG. 3. The method 300 may be executed by a computer system executing one or both of the orchestrator 122 and the Kubernetes master 124 or by a different computer system in the network environment 100.

The method 300 may include inspecting 302 compute nodes 110 (or equivalently cloud computing resources 114) and identifying entities hosted thereon, such as identifying 304 pods, identifying 306 application instances, and identifying 308 storage volumes mounted to the compute nodes. Steps 304 and 306 may further include recording relationships: application instances managed by containers of an identified pod, and/or containers managed by an identified pod.

The method 300 may further include identifying other entities that may be part of a bundled application. For example, the method 300 may include identifying clusters and identifying the compute nodes 110 managed by each cluster. In another example, disks 108 within a storage node 106 may be identified and objects within a storage volume implemented on a disk may be identified.

The method 300 may further include identifying storage nodes 106 (or equivalently cloud storage) resources 116 hosting the storage volumes identified at step 308.

The method 300 may include determining 312 dependencies. This may include identifying application instance dependencies. This may include evaluating network/topology data 208 and may also include evaluating application logs to identify references to a first application instance by second application instance, such as the second application instance receiving a request from the first application instance or the second application instance generating a request to the second application instance.

Determining 312 dependencies may include determining dependency on a particular disk 108, i.e. identifying storage volumes having at least a portion hosted on a disk. This information may be obtained from the storage manager 102. Identifying dependencies may include associating application instances with containers hosting them, identifying pods managing containers. This information may likewise be obtained from application logs, logs of the Kubernetes master 124 that created the pods and/or containers, or a listing of such information in the network/topology data 208

The method 300 may include identifying 314 user accounts for the application instances identified at step 306. This may include evaluating application logs for records of access by user accounts or creation of user accounts. Step 314 may include evaluating configuration files or running a script in order to discover user accounts. As used herein, "user accounts" may additionally or alternatively be understood to include "tenant accounts," i.e. an enterprise that utilizes services provided by the bundled application and that can include a plurality of user accounts associated with it.

The method 300 may further include identifying 316 redundancy. In particular, storage volume may be replicated such that each write to one storage volume is executed with respect to one or more replica storage volumes. An application instance may be a backup of another application instances or multiple application instances may function as a redundancy pool such that a request may be handled by any application instance in the pool. Identifying replication and redundancy may be performed by evaluating the network/topology data 208, which may identify redundancy relationships between entities. Replication and redundancy may also be inferred by evaluating application logs to identify entries recording configuration of an application to function as a replica of another to use another instance as a backup.

The method 300 may then include processing 318 each entity of at least a portion of the entities identified at steps 302, 304, 306, 308 to identify and quantify 320 dependency of the bundled application on that entity.

For example, for a node 106, 110, step 320 may include identifying directly hosted entities (storage volumes, application instances, file objects) using information gathered at steps 306 and/or 310. For hosted, entities, first order entities may be identified as having first order dependencies on the directly hosted entities. For example, this may include containers having a hosted storage volume mounted thereto. A first order dependency may be a pod being dependent on a container managed by the pod. A hosted dependency may include an application hosted by a container. For a first application instance, a first order dependency may include a second application instance that is dependent on the first application instance due to using a service provide by the first application instance. Another example of a first order dependency is a storage volume storing data required for functioning of another entity, such as file objects or a storage volume 220 storing operation scripts or other executables for implementing the application bundle 200.

In a like manner, second, third, fourth, and higher order entities may be identified. For example, second order entities may be entities having a first order dependency on the first order entities, third order entities may be entities having a first order dependency on the second order entities, and so on. As is apparent, the dependencies may be understood as a hierarchy with a root being a node 108, 110 and the directly hosted entities, first order entities, second order entities, etc. being descendants of the node in the hierarchy.

Step 320 may further include generating a metric characterizing dependency on an entity based on the identified dependencies. For example, a "blast radius" may be calculated for each entity processed. In some embodiments, a blast radius is a total number of dependent entities identified (directly hosted, first order, second order, third order, or any number of higher order entities). Note that this metric may account for replication and redundancy. For example, suppose a first order entity has a replica or redundant entity, the first order entity may be either ignored (not counted) or counted as a fraction (e.g., ⅓ if one of 3 replicas or members of a redundancy pool).

In some embodiments, only a particular type of entity is counted for the metric. For example, the number of user accounts having a dependency (first order, second order, third order, etc.) on an entity may be counted as part of the blast radius of that entity.

Figure 4:
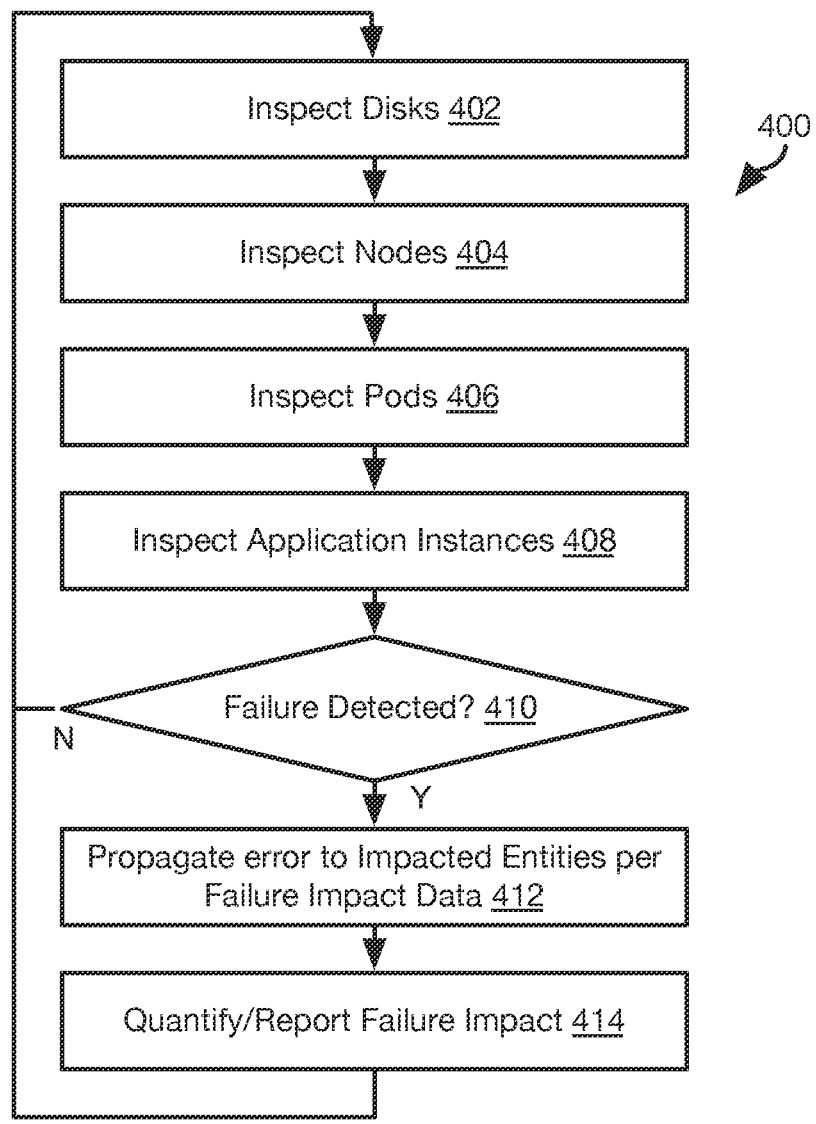
FIG. 4 is a process flow diagram of a method for determining impact of a failure in accordance with an embodiment of the present invention.

FIG. 4 illustrates a method 400 that may be executed in order to proactively detect failures and determine their impact on a bundled application. The method 400 may be executed by a computer system executing one or both of the orchestrator 122 and the Kubernetes master 124 or by a different computer system in the network environment 100.

The method 400 may include inspecting hardware devices in the network environment 100 hosting entities of the bundled application. This may include inspecting 402 disks 108 (or equivalently cloud storage resources 116), inspecting 404 compute nodes and storage nodes 106 (or equivalently cloud computing resources 114). The method may further include inspecting 406 pods and inspecting 408 application instances of a bundled application. Other entities that may be inspected may include clusters (e.g., executable implementing a cluster), storage volumes, file objects, and containers of a bundled application. Inspection as used herein may include performing a health check, generating a test transmission (ping, TCP connection, etc.) to determine response time, evaluating an error log, or performing other actions to evaluate a state of the entity being inspected.

If failure of an entity inspected is found 410 to have been detected ("the failed entity"), the method 400 may include propagating 412 the failure to entities implicated by the failure using the failure impact data. In particular, this may include identifying the entities listed in the blast radius of the failed entity, such as the blast radius obtained as described above with respect to the method 300. Step 412 may include transmitting an error message to the entities in the blast radius. Propagation 412 may be performed with reference to a dependency hierarchy of an entity. The failed entity may propagate errors to either its ancestors in a dependency hierarchy of another entity or descendants of the failed entity in the dependency hierarchy of the failed entity or that of another entity that includes the failed entity.

The method 400 may further include quantifying and reporting 414 an impact of the failure detected at step 410. For example, this may include reporting the failure with respect to the dependency metric of the failed entity, e.g., a number of user accounts, impacted by the failure and/or a listing of the user accounts. Step 414 may include reporting the failure to the users associated with the user accounts, e.g., reporting information describing the failure of the failed entity, such as an error message. Quantifying and reporting 414 may further include calculating and reporting counts or listings of other entities dependent on the failed entity, e.g., application instances, pods, storage volumes, etc. The report 414 may indicate a proposed solution to the failure: e.g., replacement of the failed entity, migration of an entity to a different node, perform backup. This action may be reported or may be implemented automatically.

In some embodiments, reports may be generated in the absence of a detected failure and indicate data such as performance, detailed status of an entity (e.g., results of a health check or statuses of sub-components of an entity), a state of replication (e.g., number of operational replicas or other operational entities in a redundancy pool), a state of a task (start up, backup, snapshot creation, rollback), or other information.

Figure 5:
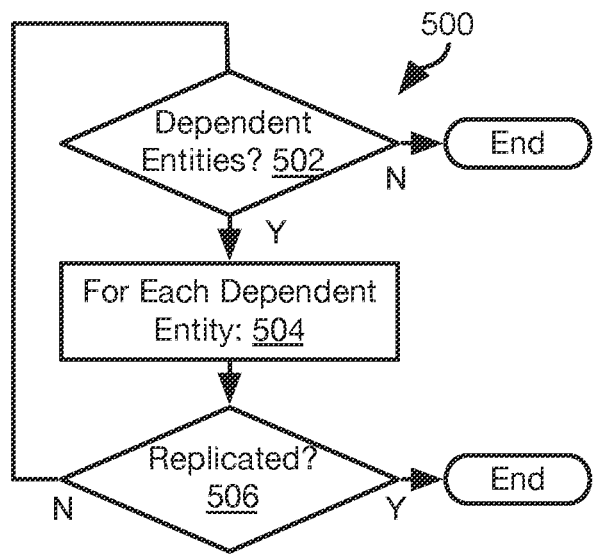
FIG. 5 is a process flow diagram of a method for accounting for replication and redundancy in accordance with an embodiment of the present invention.

Referring to FIG. 5, in some embodiments, quantifying 320 dependency and propagating 412 failure may take into account replication and redundancy. For example, the method 500 may include evaluating 502 whether the failed entity had dependent entities (see definition of first order dependency above). If not, the method 500 ends. If so, the method 500 may include, processing 504 each dependent entity by evaluating 506 whether that dependent entity has an operational replica or redundant entity, i.e., is at least one (or some other minimum number) other replica storage volume current and operational, is there at least one (or some other minimum number) other entity in a redundancy pool including the dependent entity that is operational. Note that "operational" may include not being dependent on the failed entity directly or by way of another intermediate entity. If so, the method 500 ends with respect to that dependent entity and that dependent entity and its dependents are not counted as implicated by the failed entity. If not, then the method 500 may be repeated from step 502 with the dependent entity, i.e. its dependents are identified and their replication status is evaluated according to the method 500.

Accordingly, at step 412 and 414, only those dependent entities that are not replicated or otherwise redundant or dependent on an entity that is not replicated or redundant may be processed, i.e. receive a report of failure or be quantified at step 414. For example, the blast radius of step 414 may be calculated while ignoring those dependent entities that are replicated or redundant as defined above with respect to FIG. 5.

Likewise, when identifying implicated user accounts, those user accounts that are dependent on a replicated or redundant entity may be omitted from a count or listing of implicated user accounts.

Figure 6:
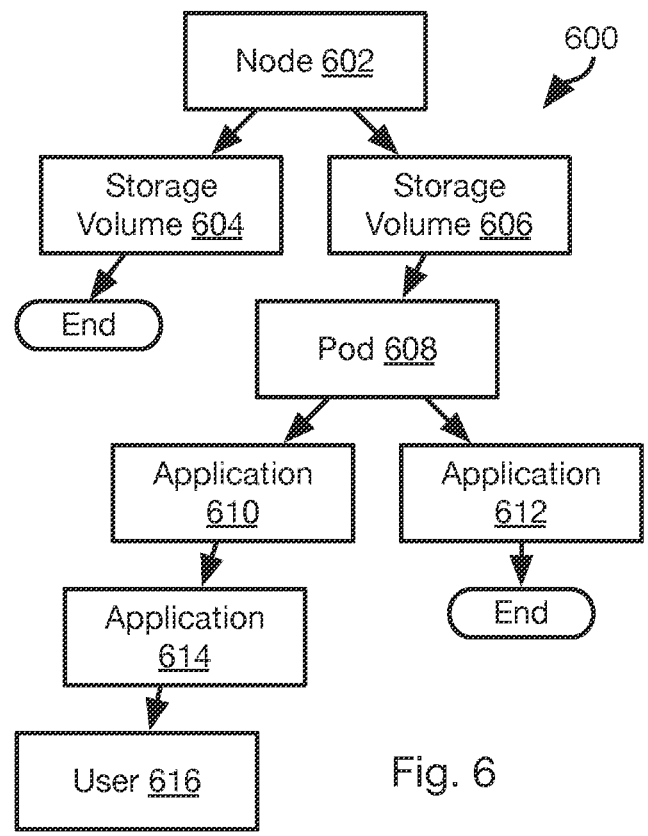
FIG. 6 is a schematic block diagram of a dependency hierarchy in accordance with an embodiment of the present invention.

FIG. 6 illustrates an example hierarchy 600 of entities that may be evaluated using the method 500. A node 602 (e.g. storage node 106) may host storage volumes 604, 606. Storage volume 604 is replicated and has a sufficient number of operational replicas and therefore the method 500 ends with respect to it and its dependents and storage volume 604 is not part of the blast radius of node 602. In contrast, storage volume 606 does not have a sufficient number of operational replicas. Accordingly, a pod 608 to which the storage volume 606 is mounted is evaluated. The pod 608 hosts two applications instances 610, 612. Application instance 612 is part of redundancy pool with a sufficient number of operational members and is therefore not further considered according to the method 500 and is not part of the blast radius of node 602. Application instance 610 is not part of a redundancy pool with sufficient operational members and is therefore further processed. This may include identifying a dependent application instance 614 and user accounts 616 of that application instance as part of the blast radius of the node 602.

Figure 7:
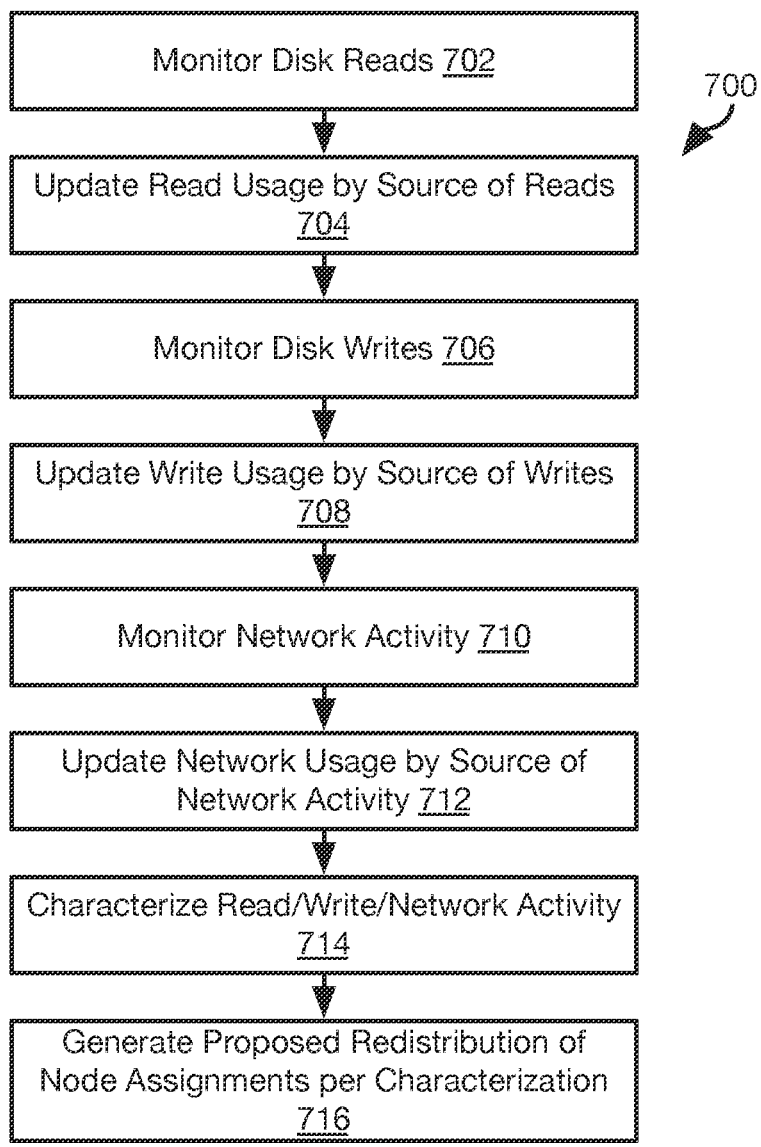
FIG. 7 is a process flow diagram of a method for managing usage of a bundled application in accordance with an embodiment of the present invention.

FIG. 7 illustrates a method 700 for using dependency information to improve performance of a bundled application. The method 700 may be executed by a computer system executing one or both of the orchestrator 122 and the Kubernetes master 124 or by a different computer system in the network environment 100.

The method 700 may include monitoring 702 disk reads received by each storage node 106 and updating 704 usage by a source of the reads (or equivalently reads received by a cloud storage resource 116). In particular, a read request may originate from a source entity (user account of an application). The read request may traverse one or more intermediate entities (container hosting the application, pod managing container, other applications or routing components) before being received by the storage node 106. Accordingly, usage of the storage node 106 by these entities and the source entity may be updated in response to each read request. The source and intermediate entities may be identified according to the dependency hierarchy of the storage node or may be specified in the read request itself. For example, the source entity may be identified in the read request and intermediate entities may be identified as being ancestors of the source entity in the dependency hierarchy of the storage node 106. Updating usage may include updating a counter, frequency (reads per unit time), or other statistic for the source entity and intermediate entities in response to the read request.

The method 700 may include monitoring 706 disk writes and updating 708 write usage for the source entity and intermediate entities of the writes. The source and intermediate entities may be identified as described above with respect to step 704. For example, by using an identifier of the source entity included in a write request and the dependency hierarchy of the storage node 106 (or equivalently the cloud storage resource 116) that received the write request as described above. Likewise, updating the write usage of these entities may include updating a counter, frequency (reads per unit time), or other statistic for the source entity and the intermediate entities in response to the write request.

The method 700 may include monitoring 710 network activity and updating 712 network usage for the source entity and intermediate entities of the network activity. Network usage may include usage of a network service, network routing components, or the like. The source entity may be identified as based on a source address of the network activity (e.g., and IP address of an originating application). For example, by using an identifier of the source entity included in network activity, the intermediate entities may be determined from the dependency hierarchy of the entity that processed the network activity. Updating 712 the network usage of these entities may include updating a counter, frequency (transmissions per unit time), or other statistic for the source entity and the intermediate entities in response to the network activity.

The method 700 may further include characterizing 714 some or all of read activity, write activity, and network activity of source entities and generating 716 a proposed redistribution of node assignments according to the characterization. Characterizing 714 may include determining, for a given destination entity (destination of a write request, read request, or network activity) usage by source entities, such as the top N source entities with highest usage (write, read, and or network usage) of the destination entity. A proposed redistribution may include offloading the source entity with the highest usage to a different destination, e.g., host the storage volume used by the source entity with highest read usage, write usage, or combination of read and write usage, on a different storage node 106. The proposed redistribution may be transmitted to an administrator of the bundled application or automatically implemented by the orchestrator 122 or KUBERNETES master 124.

Figure 8:
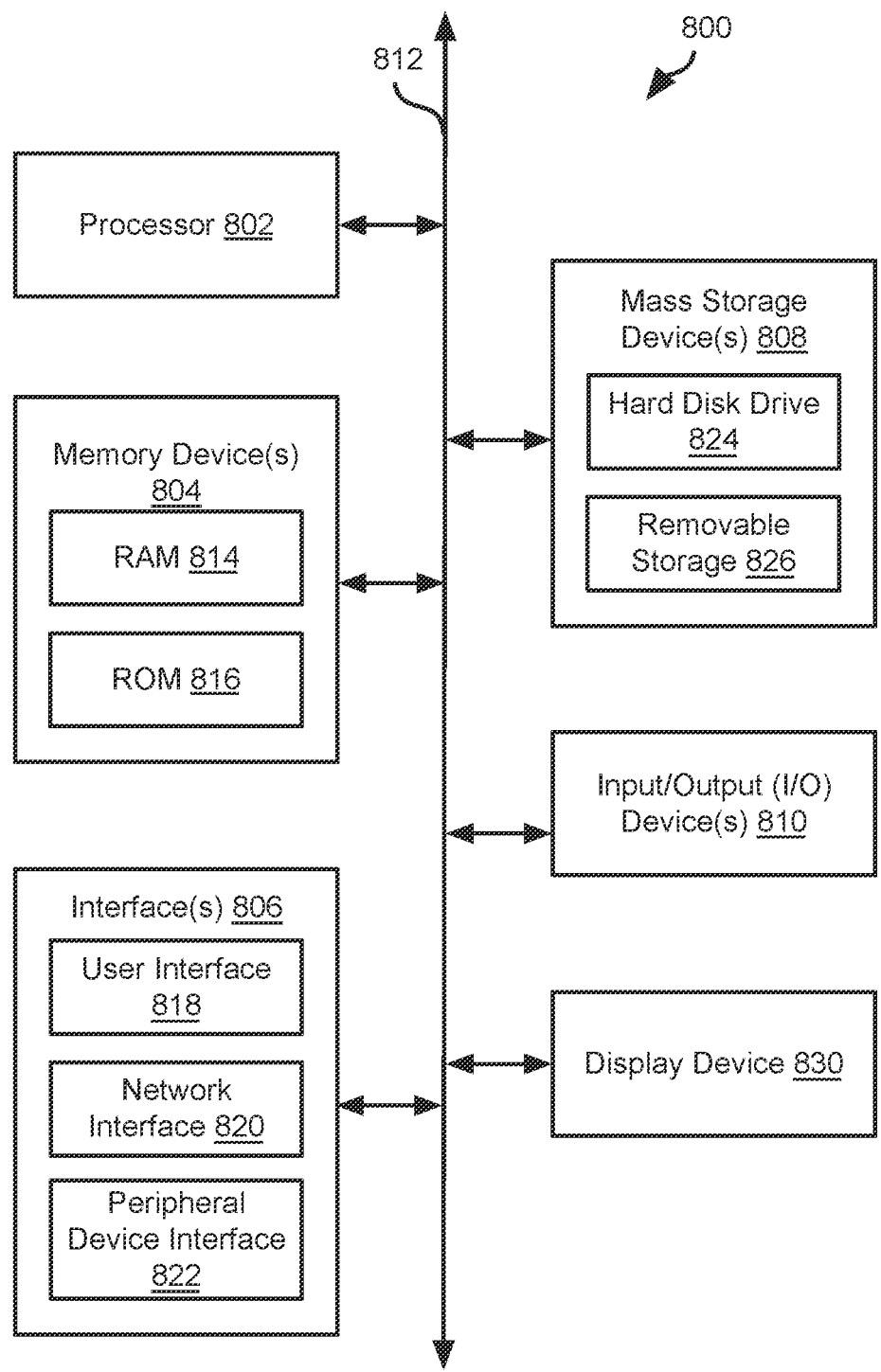
FIG. 8 is a schematic block diagram of an example computing device suitable for implementing methods in accordance with embodiments of the invention.

FIG. 8 is a block diagram illustrating an example computing device 800. Computing device 800 may be used to perform various procedures, such as those discussed herein. The storage manager 102, storage nodes 106, compute nodes 110, and cloud computing platform 112, may have some or all of the attributes of the computing device 800.

Computing device 800 includes one or more processor(s) 802, one or more memory device(s) 804, one or more interface(s) 806, one or more mass storage device(s) 808, one or more Input/output (I/O) device(s) 810, and a display device 830 all of which are coupled to a bus 812. Processor(s) 802 include one or more processors or controllers that execute instructions stored in memory device(s) 804 and/or mass storage device(s) 808. Processor(s) 802 may also include various types of computer-readable media, such as cache memory.

Memory device(s) 804 include various computer-readable media, such as volatile memory (e.g., random access memory (RAM) 814) and/or nonvolatile memory (e.g., read-only memory (ROM) 816). Memory device(s) 804 may also include rewritable ROM, such as Flash memory.

Mass storage device(s) 808 include various computer readable media, such as magnetic tapes, magnetic disks, optical disks, solid-state memory (e.g., Flash memory), and so forth. As shown in FIG. 8, a particular mass storage device is a hard disk drive 824. Various drives may also be included in mass storage device(s) 808 to enable reading from and/or writing to the various computer readable media. Mass storage device(s) 808 include removable media 826 and/or non-removable media.

I/O device(s) 810 include various devices that allow data and/or other information to be input to or retrieved from computing device 800. Example I/O device(s) 810 include cursor control devices, keyboards, keypads, microphones, monitors or other display devices, speakers, printers, network interface cards, modems, lenses, CCDs or other image capture devices, and the like.

Display device 830 includes any type of device capable of displaying information to one or more users of computing device 800. Examples of display device 830 include a monitor, display terminal, video projection device, and the like.

Interface(s) 806 include various interfaces that allow computing device 800 to interact with other systems, devices, or computing environments. Example interface(s) 806 include any number of different network interfaces 820, such as interfaces to local area networks (LANs), wide area networks (WANs), wireless networks, and the Internet. Other interface(s) include user interface 818 and peripheral device interface 822. The interface(s) 806 may also include one or more peripheral interfaces such as interfaces for printers, pointing devices (mice, track pad, etc.), keyboards, and the like.

Bus 812 allows processor(s) 802, memory device(s) 804, interface(s) 806, mass storage device(s) 808, I/O device(s) 810, and display device 830 to communicate with one another, as well as other devices or components coupled to bus 812. Bus 812 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 800, and are executed by processor(s) 802. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method comprising:
providing a network environment including a plurality of computing nodes and a plurality of storage nodes;
instantiating a bundled application in the network environment resulting in instantiation of a plurality of application instances in the network environment; and
determining a dependency of the bundled application on a subject entity of a plurality of entities, the plurality of entities including the plurality of computing nodes, the plurality of storage nodes, and the plurality of application instances, determining the dependency of the bundled application on the subject entity including identifying a group of the plurality of entities that are dependent on the subject entity either directly or indirectly and that are not redundant with respect to another entity of the plurality of entities that is not dependent on the subject entity;
further comprising, generating a dependency metric for the subject entity according to dependency of the bundled application on the subject entity;
wherein the dependency metric is a number of user accounts associated with a portion of the plurality of application instances that are in the group.

2. The method of claim 1, wherein the plurality of entities include a plurality of storage volumes hosted by the plurality of storage nodes and the group does not include storage volumes that are replicated independently of the subject entity.

3. The method of claim 1, wherein the plurality of entities further include containers hosting the plurality of application instances.

4. The method of claim 3, wherein the plurality of entities further include pods managing the containers.

5. The method of claim 1, wherein the network environment is a cloud computing environment.

6. The method of claim 1, further comprising:
monitoring usage of the subject entity by other entities of the plurality of entities; and
generating a proposed redistribution of other entities of the plurality of entities according to the usage.

7. The method of claim 1, wherein the plurality of application instances implement a pipeline of network services.

8. The method of claim 1, wherein instantiating the bundled application comprises instantiating the bundled application using KUBERNETES.

9. A system comprising:
a network environment including a plurality of nodes coupled to one another by a network, each node of the plurality of nodes including one or more processing devices and one or more memory devices;
wherein one or more nodes of the plurality of nodes are programmed to:
instantiate a bundled application in the network environment resulting in instantiation of a plurality of application instances in the network environment; and
determine a dependency of the bundled application on a subject entity of a plurality of entities by identifying a group of the plurality of entities that are dependent on the subject entity either directly or indirectly and that are not redundant with respect to another entity of the plurality of entities that is not dependent on the subject entity, the plurality of entities including the plurality of nodes, and the plurality of application instances;
wherein the one or more nodes are further configured to generate a dependency metric for the subject entity according to dependency of the bundled application on the subject entity;
wherein the dependency metric is a number of user accounts associated with a portion of the plurality of application instances that are in the group.

10. The system of claim 9, wherein the plurality of entities include a plurality of storage volumes hosted by a portion of the plurality of nodes and the group does not include storage volumes that are replicated independently of the subject entity.

11. The system of claim 9, wherein the plurality of entities further include containers hosting the plurality of application instances.

12. The system of claim 11, wherein the plurality of entities further include pods managing the containers.

13. The system of claim 9, wherein the network environment is a cloud computing environment.

14. The system of claim 9, wherein the one or more nodes are further programmed to:
monitor usage of the subject entity by other entities of the plurality of entities; and
generate a proposed redistribution of other entities of the plurality of entities according to the usage.

15. The system of claim 9, wherein the plurality of application instances implement a pipeline of network services.

16. The system of claim 9, wherein the one or more nodes execute a KUBERNETES master.

\* \* \* \* \*